(12) United States Patent
Van Phan et al.

(10) Patent No.: US 8,996,017 B2
(45) Date of Patent: Mar. 31, 2015

(54) METHOD AND APPARATUS FOR DISTRIBUTING SYNCHRONIZATION INFORMATION

(75) Inventors: Vinh Van Phan, Oulu (FI); Sami Hakola, Kempele (FI); Timo Koskela, Oulu (FI); Samuli Turtinen, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 57 days.

(21) Appl. No.: 13/878,848

(22) PCT Filed: Oct. 11, 2010

(86) PCT No.: PCT/EP2010/065208
§ 371 (c)(1),
(2), (4) Date: Apr. 11, 2013

(87) PCT Pub. No.: WO2012/048729
PCT Pub. Date: Apr. 19, 2012

(65) Prior Publication Data
US 2013/0203424 A1 Aug. 8, 2013

(51) Int. Cl.
*H04W 56/00* (2009.01)
*H04W 16/14* (2009.01)
*H04W 24/00* (2009.01)
*H04W 28/04* (2009.01)
(Continued)

(52) U.S. Cl.
CPC ............ *H04W 56/001* (2013.01); *H04W 16/14* (2013.01); *H04W 24/00* (2013.01); *H04W 28/04* (2013.01); *H04W 48/08* (2013.01);
(Continued)

(58) Field of Classification Search
CPC ..... H04W 16/14; H04W 16/16; H04W 64/00; H04W 24/00; H04W 28/04; H04W 56/001; H04W 56/003; H04W 74/0833; H04W 84/045; H04W 48/08
USPC .......... 455/448, 450, 501; 370/252, 335, 504, 370/508
See application file for complete search history.

(56) References Cited

U.S. PATENT DOCUMENTS

| | | | |
|---|---|---|---|
| 2005/0053099 A1* | 3/2005 | Spear et al. ................... | 370/508 |
| 2009/0097452 A1 | 4/2009 | Gogic ........................... | 370/331 |
| 2010/0216478 A1 | 8/2010 | Buddhikot et al. ........... | 455/450 |

FOREIGN PATENT DOCUMENTS

| | | |
|---|---|---|
| WO | WO 02/19743 A2 | 3/2002 |
| WO | WO 2005/062798 A2 | 7/2005 |

OTHER PUBLICATIONS

MediaTek Inc.; "Inter-cell Interference Mitigation for Uplink Channels in Heterogeneous Networks"; 3GPP draft R1-104544; 3GPP TSC RAN WG1 Meeting #62; Aug. 23-27, 2010; Madrid, Spain; whole document (4 pages).

*Primary Examiner* — Sam Bhattacharya
(74) *Attorney, Agent, or Firm* — Harrington & Smith

(57) ABSTRACT

An apparatus including at least one processor and at least one memory including computer program code, the at least one memory and the computer program code configured to, with the at least one processor, cause the apparatus to at least evaluate, in a cognitive node, transmission of a physical random access channel in an uplink of a communications carrier, and, based on the evaluating, utilize an interference-free guard time period of a cellular user terminal's transmission in the physical random access channel, for distributing a synchronization signal and a beacon signal locally, the cellular user terminal's transmission in the physical random access channel including a guard time period that compensates a maximum round trip delay in a cell.

28 Claims, 5 Drawing Sheets

(51) Int. Cl.
  *H04W 48/08* (2009.01)
  *H04W 74/08* (2009.01)
  *H04W 84/04* (2009.01)

(52) U.S. Cl.
  CPC ........ *H04W56/003* (2013.01); *H04W 74/0833* (2013.01); *H04W 84/045* (2013.01)
  USPC .......................................... 455/448; 455/508

METHOD AND APPARATUS FOR DISTRIBUTING SYNCHRONIZATION INFORMATION

FIELD OF THE INVENTION

The exemplary and non-limiting embodiments of this invention relate generally to distributing synchronization information within a heterogeneous network.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context. Heterogeneous networks are being increasingly deployed which have various network topologies integrated into a cellular network topology. For example, in accordance with long term evolution (LTE)/LTE-advanced (LTE-A) 3rd generation partnership project (3GPP), a heterogeneous network may include a combination of microcells, pico cells, femto cells and relay cells operating in the same spectrum. Within a heterogeneous network, it may be desirable in some instances for various devices and machines to directly communicate in a local domain either with or without supervision of the network. Within a local domain, a heterogeneous network may therefore provide for network control or autonomous device-to-device (D2D) communication including communications in various clusters devices. Operation in the local domain of a heterogeneous network may also include a grid or group of local machines communicating and performing certain tasks in a cooperative manner. A heterogeneous network may also allow a device having advanced capabilities to serve as a gateway to the heterogeneous network for a number of devices or machines having relatively lesser capabilities.

A heterogeneous network may also provide for the autonomous operation of femto base stations. Femto base stations are local or sub-communication stations and may provide an access point, such as a user installed access point, that provides coverage to a corresponding femto cell that is located within a larger cell, e.g. a macro cell, defined by the coverage area of a network installed base station. As such, a femto base station may provide for in-home (or business) mobility with improved data rates and quality of service (QoS) as compared to a network installed base station, which may be loaded heavily from communications with other mobile terminals or subscribers and/or may be shielded somewhat by buildings or other obstructions. As used herein, femto base station is used generally to reference femto base stations, home node Bs (HNBs), local nodes or the like.

Some femto base stations, known as cognitive femto base stations, are configured for autonomous operation. A femto base station configured to operate autonomously may be movable and/or may be configured to adapt into the prevailing radio environment at any location and at any time. As a result of its autonomous operation, a cognitive femto base station may identify a suitable carrier to support communications with the network without burdening the network with the task of allocating the carrier to the femto base station.

The integration of local heterogeneous communication, such as between devices in the local domain or by a femto base station, may require the devices to identify and use radio resources of the network in such a manner that a relatively limited amount of network assistance is required and interference is not created with the other users of the network. As such, it may be desirable to provide for the allocation of a carrier to a cognitive femto base station in a manner that reduces or eliminates network involvement while correspondingly taking into account an interference issues created for other users of the network.

BRIEF DESCRIPTION OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, an apparatus, a computer program product, and a computer program product as defined in the independent claims. Further embodiments of the invention are disclosed in the dependent claims. An aspect of the invention relates to a method comprising evaluating, in a cognitive local node, transmission of a physical random access channel in an uplink of a communications carrier, and, based on the evaluating, utilizing an interference-free guard time period of a cellular user terminal's transmission in the physical random access channel, for distributing a synchronization signal and a beacon signal locally, the cellular user terminal's transmission in the physical random access channel including a guard time period that compensates a maximum round trip delay in a cell.

A further aspect of the invention relates to an apparatus comprising at least one processor and at least one memory including computer program code, the at least one memory and the computer program code configured to, with the at least one processor, cause the apparatus to at least evaluate, in a cognitive node, transmission of a physical random access channel in an uplink of a communications carrier, and, based on the evaluating, utilize an interference-free guard time period of a cellular user terminal's transmission in the physical random access channel, for distributing a synchronization signal and a beacon signal locally, the cellular user terminal's transmission in the physical random access channel including a guard time period that compensates a maximum round trip delay in a cell.

A still further aspect of the invention relates to a computer program product comprising program code instructions for evaluating, in a cognitive local node, transmission of a physical random access channel in an uplink of a communications carrier, and program code instructions for utilizing, based on the evaluating, an interference-free guard time period of a cellular user terminal's transmission in the physical random access channel, for distributing a synchronization signal and a beacon signal locally, the cellular user terminal's transmission in the physical random access channel including a guard time period that compensates a maximum round trip delay in a cell.

The aspects of the invention enable local synchronization and beacon signal broadcast in autonomous heterogeneous communication.

BRIEF DESCRIPTION OF THE DRAWINGS

In the following the invention will be described in greater detail by means of exemplary embodiments with reference to the attached drawings, in which.

DETAILED DESCRIPTION OF THE DRAWINGS

Figure 1:
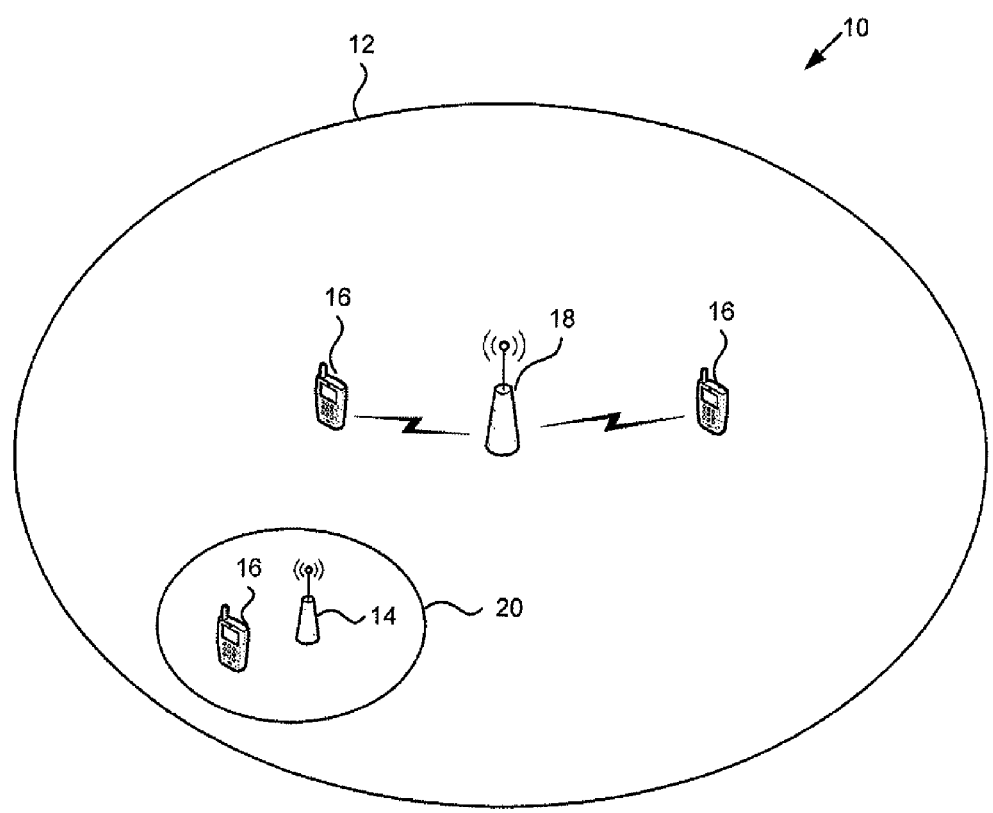
FIG. 1 is an illustration of a heterogeneous network in accordance with an exemplary embodiment.

In a method for femto-cell base stations in uncoordinated communication networks the femto cell in question obtains synchronization information from another base station, and adjusts its clock in response to the synchronization information. The timing synchronization information can be identified from a strongest synchronization signal from nearby uncoordinated base stations. The timing synchronization can accommodate clock offsets and frequency offsets.

In a further method the cognitive femto cells find suitable carriers and thereby resources for their own use by observing the variation of signal power levels in different resources of the cellular system uplink channel. According to the method, the variation of the received signals from the cellular users is high if the observing node is far away from the victim eNB. In practice, it is desired that local communication is conducted sufficiently far from the victim eNB.

In a yet further method a source user measures a random access (RA) preamble sent by destination user when it is trying to connect to eNB. Based on this measurement information, the source user can preliminarily estimate the quality of a D2D link, and this estimation result is utilized as a reference for an initial D2D decision at the source user.

Cognitive local nodes, e.g. autonomously operating femto cells, are adapting into prevailing radio environments anytime and anyplace. Among local devices it may be desirable, e.g. from power efficiency point of view, that not all devices within a specific cluster or femto cell operation are performing heavy synchronization procedure. That brings a new issue that how such a cognitive femto node or cluster head distributes the synchronization information as well as beacon signal to its users or peers reliably.

In an exemplary embodiment, a LTE PRACH guard period is utilized for the low rate control signalling purposes of a secondary system (synchronization channel etc). In an exemplary embodiment, a cognitive node observes the transmission of a physical random access channel (PRACH) in an LTE-based cellular uplink channel and utilizes an interference free guard time period of a cellular user's transmission in PRACH to distribute a synchronization signal as well as a beacon signal locally. Reasoning for that is that in PRACH transmission, cellular users' transmission includes a guard time period for compensating a maximum round trip delay (RTD) in the cell. A local node which is already synchronized to the network, is able to observe the time instant of the guard time period of its near cellular users and utilize that interference-free time to locally broadcast the beacon signal and the synchronization information.

In a further embodiment the cognitive node or cluster head periodically distributes the synchronization information to its users or peers by utilizing interference free guard time period of the cellular users' transmission in PRACH.

In a further embodiment the serving eNB could inform the cognitive node or cluster head about the maximum round trip delay (RTD) it has experienced so that a local device could evaluate the overlaying cell size. Reasoning for that is that with a small cell size (ISD<2000 m), the PRACH guard time period could be utilized anywhere in the cell since the maximum RTD of the RA of the cellular users would be very short and couldn't overlap with the local signal send at the end of the guard time period.

In a further embodiment, it is proposed that either the synchronization signal or the beacon signal (may be considered as a local control signal) indicates whether the synchronization signal is sent in the beginning or at the end of the PRACH TTI of the cellular system. Reasoning for that is that, depending of the overlaying cell size of the cellular system, it may be more suitable to distribute the synchronization signal either in the beginning of the PRACH TTI or at the end of the PRACH TTI. This causes uncertainty for the devices and machines that are to be attached to the local cognitive node, and thus it should be readable from the received signal because the actual data transmission is supposed to occur in synchronization with the TTIs of the overlaying cellular system.

By means of the embodiment, the local synchronization procedure is simplified since no other resources are needed for the local broadcasting. With reasonable cellular cell size, there is enough time for the control signal transmission.

Integration of new network topologies into a cellular network topology gains more and more attraction and interest both in industry and academy. Examples of those include e.g. a current study item of heterogeneous networks (=a deployment of macros, micros, picos, femtos and relays in a same spectrum) in LTE/LTE-A of 3GPP. One step further is to enable heterogeneous local communication directly among devices and machines either with or without supervision of the network as well as autonomous operation of femto cells (cognitive femtos). Heterogeneous local communication in local domain may include e.g.:

network-controlled or autonomous device-to-device (D2D) communication including communication in the clusters of the devices, a grid/group of local machines communicating and/or performing certain tasks in co-operative way, an advanced device acting as a gateway for a bunch of low-capability devices or machines to access the network, autonomous femto cell operation.

Aforementioned local communication schemes play a remarkable role as consideration of future network development. In addition, there are visions that there will be 50 billion devices with wide variety of capabilities connected to the networks by 2020. Heterogeneous local communication plays also a big role in view of the future wireless networking.

The integration of the local heterogeneous communication into a cellular network means that the devices try to find and use the radio resources of the cellular system by using as low amount of network assistance as possible and without causing interference to the cellular users. The actual local communication takes place on uplink resources of the cellular network due to following reasons:

regulatory issues may prevent transmitting on downlink by the devices of the D2D pair, it is easier to control the interference from the D2D devices to the cellular devices, the D2D devices are able to maintain synchronization to the network via listening downlink common channels, paging of the devices by the network is also possible.

An exemplary embodiment is related to cognitive local nodes to provide solutions to broadcast a local synchronization signal as well as a beacon signal when operating opportunistically in uplink resources of the overlaying cellular network. It enables providing local synchronization and beacon signal broadcast in autonomous heterogeneous communication in the future cellular networks. Examples of the cognitive local nodes include a cognitive femto cell, a machine-to-machine (M2M) gateway providing access to a grid of machines to the network and cluster of directly communicating devices. In LTE, there are four different preamble formats used for PRACH transmission. In most cases, a preamble format 0 is used (due to smaller cell sizes, for example, in urban areas), which refers to maximum cell radius of 14.53 km. For the preamble format 0, the guard time period is the shortest of the formats but still ~97 μs (2976*Ts) long. Each PRACH preamble also occupies a bandwidth of 6 resource blocks of uplink bandwidth.

The local cognitive femto node or cluster head is supposed to be synchronized to the primary network uplink channel of an LTE based cellular system and selected a carrier for its use of which the victim eNB is supposed to be as far as possible. By using the synchronization information and listening to downlink for PRACH configuration index to know when PRACH subframe takes place, the cognitive node is able to evaluate the local guard time period of the PRACH transmission of the cellular users. If the a PRACH subframe is scheduled beneath PUSCH transmission subframes, the utilization of the guard time takes place either at the beginning of the TTI period or at the end of it, which depends on the cell radius or rather on the local node distance to the victim eNB. In certain high load situations PRACH may utilize the bandwidth continuously in time, so the utilization place in time does not depend on the subframe timing in the local point of view.

Embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g. implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g. volatile or non-volatile memory device), can be differentiated from a "computer-readable transmission medium," which refers to an electromagnetic signal.

With the increasing utilization of heterogeneous networks having a number of different access networks with varying spectrum allocations, a cognitive pilot channel (CPC) has been proposed to facilitate utilization of a heterogeneous network by mobile terminal. The CPC is designed to carry information regarding the different network operators, the ratio access technology employed within the heterogeneous network, the frequencies allocated to a particular region and the like. Based upon the information provided via the CPC, a mobile terminal may identify an appropriate system within the heterogeneous network without having to scan the entire spectrum.

Techniques have also been developed to allow femto base stations having flexible spectrum usage to utilize opportunistically overlaying cellular system uplink resources. In order to avoid causing interference for a base station, femto base stations must generally be deployed sufficiently far away from the base station. As such, a femto base station must be able to determine if the femto base station is sufficiently far away from the base station, and, if so, to select the most suitable carrier. In order to determine if the femto base stations are sufficiently far enough away from the base station, the femto base station may rely on measurement assistance from the users of the femto base station to estimate the downlink path loss from the base station. As such, these techniques have required the femto base station and/or the users of the femto base station to listen to the downlink transmissions from the base station.

One example of a communications system 10, such as a wireless communications system, having a heterogeneous network 12 which, in turn, includes a femto base station 14 is depicted in FIG. 1. The system may include a plurality of devices comprising the heterogeneous network 12 and enabling a mobile terminal 16 to communicate with other terminals or devices of the network. In this regard, the mobile terminal 16 may interface with the network 12 via one or more access points, base sites or base stations (BS). The mobile terminal 16 may be embodied in various manners and may include, for example, a portable digital assistant (PDA), pager, mobile computer, mobile television, gaming device, laptop computer, camera, video recorder, global positioning system (GPS) device, mobile telephone, cellular telephone and other types of voice and text communications systems. The access points may be a part of one or more cellular networks (e.g. first-generation (1G), second-generation (2G), 2.5G, third-generation (3G), 3.5G, 3.9G, fourth-generation (4G) mobile communication protocols, LTE, and/or the like) or data networks (e.g. local area network (LAN), a metropolitan area network (MAN), a wide area network (WAN), such as the Internet and/or the like).

The network 12 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system 10 or the network 12. One or more communication terminals such as the mobile terminal 16 may be in communication with each other or network devices via the network 12 and each may include an antenna or antennas for transmitting signals to and for receiving signals from a base station. In turn, other devices such as processing elements (e.g. personal computers, server computers or the like) may be coupled to the mobile terminal 16 via the network 12. By directly or indirectly connecting the mobile terminal 16 and other devices to the network 12, the mobile terminal may be enabled to communicate with the other devices, for example, according to numerous communication protocols including hypertext transfer protocol (HTTP) and/or the like, to thereby carry out various communication or other functions of the mobile terminal.

Furthermore, the mobile terminal 16 may communicate in accordance with, for example, radio frequency (RF), bluetooth (BT), infrared (IR) or any of a number of different wireline or wireless communication techniques, including LAN, wireless LAN (WLAN), worldwide interoperability for microwave access (WiMAX), WiFi, ultra-wide band (UWB), wibree techniques and/or the like. As such, the mobile terminal 10 may be enabled to communicate with the network 12 and other devices by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, ethernet and/or the like. As shown in FIG. 1, the mobile terminal 16 may be in communication with the network 12 via an access point having a coverage area in which the mobile terminal is located. Examples of such access points may include one or more base stations 18 and one or more femto base stations 14 having corresponding femto cells 20 at least partially overlapping with the coverage area of a base station.

Figure 2:
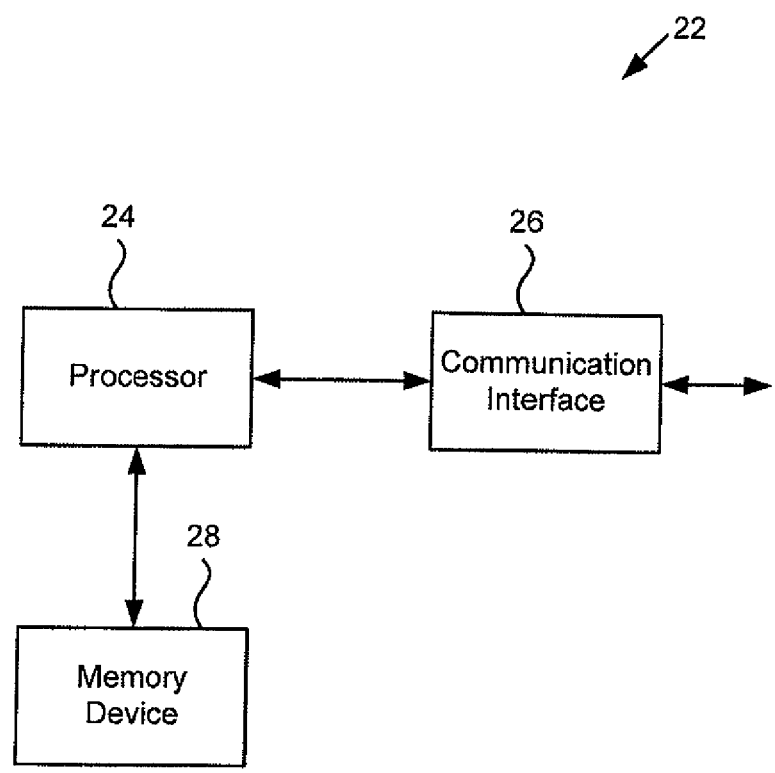
FIG. 2 is a block diagram of an apparatus in accordance with an exemplary embodiment that may be embodied, for example, by a femto base station.

FIG. 2 shows an example of an apparatus 22 that may facilitate carrier allocation for a femto base station 14 according to an example embodiment. The apparatus 22 may therefore be embodied or otherwise associated with the femto base station 16. The apparatus 22 may include or otherwise be in communication with a processor 24, a communication interface 26 and a memory device 28. The memory device 28 is a computer-readable storage medium and, as such, may be non-transitory. The memory device 28 may include, for example, volatile and/or non-volatile memory. The memory device 28 may be configured to store information, data, applications, instructions or the like for enabling the apparatus 22 to carry out various functions in accordance with an example embodiment of the present invention. For example, the memory device 28 could be configured to buffer input data for processing by the processor 24. Additionally or alternatively, the memory device 28 could be configured to store instructions for execution by the processor 24. As yet another alternative, the memory device 28 may be one of a plurality of databases that store information and/or media content.

The processor 24 may be embodied in a number of different ways. For example, the processor 24 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an example embodiment, the processor 24 may be configured to execute instructions stored in the memory device 28 or otherwise accessible to the processor. Alternatively or additionally, the processor 24 may be configured to execute hard coded functionality. As such, whether configured by hardware or software methods, or by a combination thereof, the processor 24 may represent an entity (e.g. physically embodied in circuitry) capable of performing operations according to embodiments of the present invention while configured accordingly. Thus, for example, when the processor 24 is embodied as an ASIC, FPGA or the like, the processor may be specifically configured hardware for conducting the operations described herein. Alternatively, as another example, when the processor 24 is embodied as an executor of software instructions, the instructions may specifically configure the processor to perform the algorithms and/or operations described herein when the instructions are executed. However, in some cases, the processor 24 may be a processor of a specific device (e.g. a mobile terminal or network device) adapted for employing embodiments of the present invention by further configuration of the processor by instructions for performing the algorithms and/or operations described herein. The processor 24 may include, among other things, a clock, an arithmetic logic unit (ALU) and logic gates configured to support operation of the processor 70.

Meanwhile, the communication interface 26 may be any means such as a device or circuitry embodied in either hardware, software, or a combination of hardware and software that is configured to receive and/or transmit data from/to a network and/or any other device or module in communication with the apparatus 22. In this regard, the communication interface 26 may include, for example, an antenna (or multiple antennas) and supporting hardware and/or software for enabling communications with a wireless communication network. In some environments, the communication interface 26 may alternatively or also support wired communication. As such, for example, the communication interface 26 may include a communication modem and/or other hardware/software for supporting communication via cable, digital subscriber line (DSL), universal serial bus (USB) or other mechanisms.

In some example embodiments, one or more of the processor 24, communication interface 26 and/or memory device 28 illustrated in FIG. 2 may be embodied as a chip or chip set. In other words, the apparatus 22 may comprise one or more physical packages (e.g. chips) including materials, components and/or wires on a structural assembly (e.g. a baseboard). The structural assembly may provide physical strength, conservation of size, and/or limitation of electrical interaction for component circuitry included thereon. In this regard, the processor 24, memory 28 and/or communication interface 26 may be embodied as a chip or chip set. The apparatus 22 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

Figure 3:
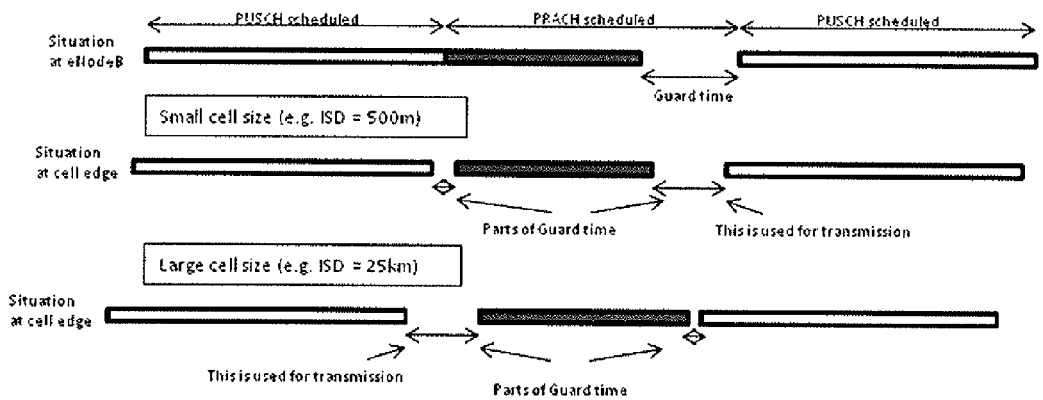
FIGS. 3 and 4 are graphical representations of PRACH guard time period utilization times in accordance with an exemplary embodiment.
Figure 4:
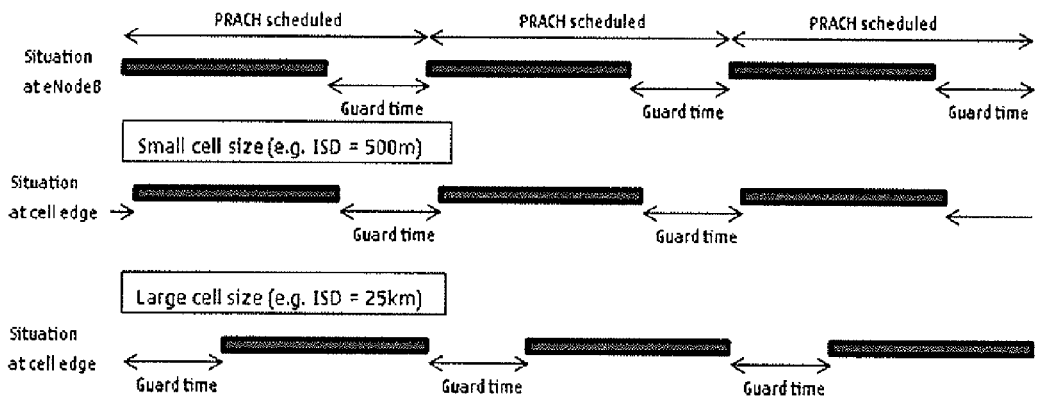

A situation of where PRACH is scheduled beneath PUSCH transmission in time both in small and large cell sizes is illustrated in FIG. 3. FIG. 4 provides an illustrative view of PRACH guard time period utilization time with different cell sizes. As seen in FIG. 3, when the cell size is growing, the most of the guard time period moves to the start of the subframe at the local point of view.

A situation of a high load channel where PRACH is scheduled continuously in time both in small and large cell sizes is depicted in FIG. 4. FIG. 4 illustrates PRACH guard time period when PRACH is scheduled continuously in time with different cell sizes. It can be seen in FIG. 4 that locally at cell edge the situation is the same as with different cell sizes, only the time instant of the guard time changes.

When considering the smaller cell sizes when the utilization of the guard time period should take place after the PRACH transmissions of cellular users, the optimal transmission time for a local signal is right before the local timing for next subframe transmission. If considering a situation where the local node is far (>10 km) from the victim eNB and the guard band utilization takes place at the beginning of the PRACH subframe, then the optimal transmission time for the local signal is right before the local timing for RA signal transmission; also when PRACH is scheduled continuously in time, the optimal timing is right before the next local timing for the RA signal transmission.

Figure 5:
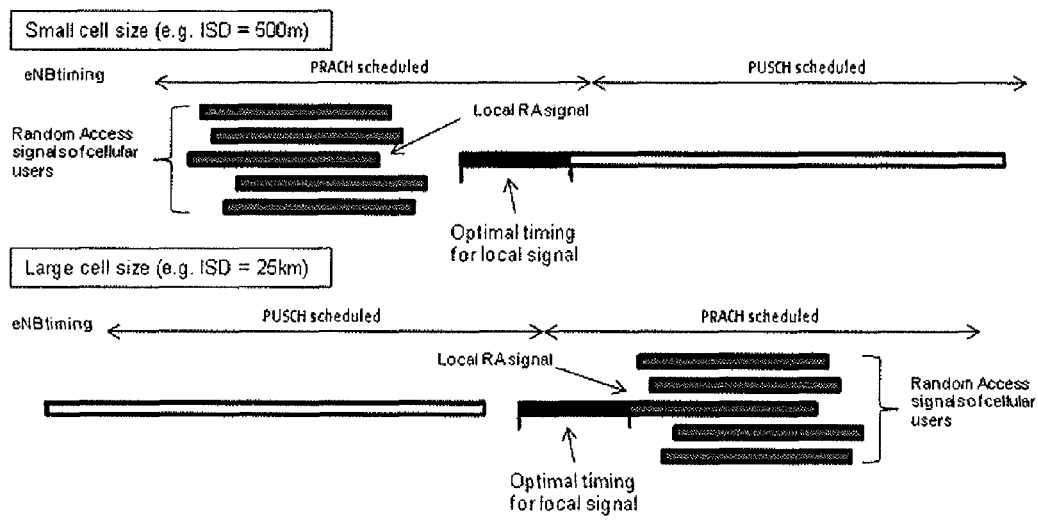
FIG. 5 is a graphical representation of optimal timing of local signal transmission in accordance with an exemplary embodiment.

FIG. 5 illustrates the optimal timing of local signal transmission both in small and large cell sizes. Because the timing of the guard period differs as a function of local distance to eNB, the synchronization information distributing device should add into the signal the information for its users to adjust their timers correctly to correspond to the correct synchronization timing because the actual data transmission should occur in synchronization with PUSCH TTIs. Furthermore, the local device is able to distribute its synchronization information periodically using the PRACH guard time.

As an increasing number of femto base stations 14 are being deployed, it would be desirable to provide an improved technique for local synchronization and beacon signal broadcast for a femto base station within a heterogeneous network 12. In one example embodiment, a method, apparatus and computer program product are provided for distributing a synchronization signal and a beacon signal to support communications with a femto base station 14 based upon an uplink PRACH transmission. In this regard, the apparatus 22, such as the processor 24, may evaluate, in the femto base station 24, transmission of a physical random access channel in an uplink of a communications carrier. The apparatus 22, such as the processor 24, may utilize an interference-free guard time period of a cellular user terminal's transmission in the physical random access channel, for distributing a synchronization signal and a beacon signal locally, the cellular user terminal's transmission in the physical random access channel including a guard time period that compensates a maximum round trip delay in a cell. However, if all uplink carriers are used in the local domain to some degree, the method, apparatus and computer program product may evaluate the channel candidates and then select a candidate in accordance with an example embodiment of the present invention as shown in FIG. 6 and described below.

Figure 6:
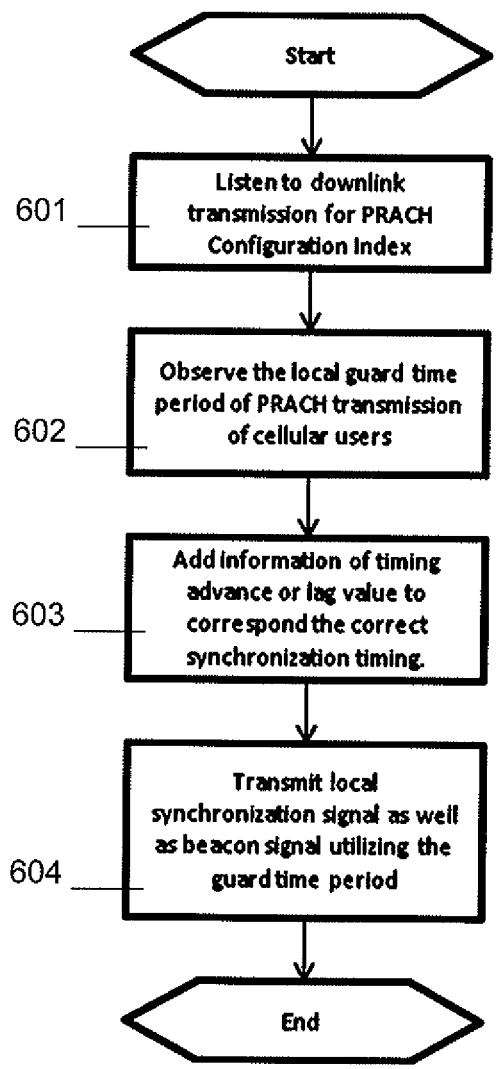
FIG. 6 is a flow chart illustrating the operations performed in accordance with an exemplary embodiment.

FIG. 6 illustrates a procedure for the cognitive node to distribute the local synchronization information. Referring now FIG. 6, the apparatus 22 may include means, such as the processor 24 or the like, for evaluating transmission of a physical random access channel in an uplink of a communications carrier, and, based on the evaluating, utilizing an interference-free guard time period of a mobile terminal's 16 transmission in the physical random access channel, for distributing a synchronization signal and a beacon signal locally, the mobile terminal's transmission in the physical random access channel including a guard time period that compensates a maximum round trip delay in a cell. A device aiming at distributing its synchronization information as well as beacon signal is arranged to perform the following procedure. The local cognitive node or cluster head finds a suitable carrier for the local use where it is located sufficiently far from the victim eNB. The local node listens 601 to the downlink signalling for information of PRACH configuration index to find out when the next PRACH subframe takes place (if not scheduled continuously in time due to high load) and in which resources. By using its own synchronization information and downlink signal information, the cognitive node observes 602 the PRACH transmission and evaluates the timing when the PRACH guard time period of the cellular users takes place locally. A signal sequence of 6 resource block wide (corresponding to PRACH transmission bandwidth) LTE uplink symbol length (~71.3 μs with CP) including the information of the timing advance or lag to the corresponding correct synchronization timing is produced 603. The local node transmits 604 the synchronization signal as well as the beacon signal by utilizing this interference free guard time period of the PRACH transmission of the cellular users. The beacon signal, or control signal, may include resource allocation information for the actual data transmission, for instance.

Thus a new method for distributing the local synchronization information as well as the beacon signal is provided. Thus it is not necessary for each device within a cluster to perform a heavy synchronization procedure.

The steps/points, signalling messages and related functions described above in FIGS. 1 to 6 are in no absolute chronological order, and some of the steps/points may be performed simultaneously or in an order differing from the given one.

Other functions can also be executed between the steps/points or within the steps/points and other signalling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

Ts sampling time interval
TTI transmission time interval
BS base station
D2D device-to-device
eNB evolved node B
PRACH physical random access channel
PUSCH physical uplink shared channel
CP cyclic prefix
LTE long term evolution
LTE-A LTE advanced
3GPP third generation partnership project
RA random access
RTD round trip delay
ISD inter-site distance

The invention claimed is:

1. A method comprising
evaluating, in a network node of a communication network, timing when a guard time period takes place for a physical random access channel in an uplink of a communications carrier of an overlaying communication network that overlays the communication network; and based on the evaluating, utilizing an interference-free guard time period of a user terminal's transmission in the physical random access channel of the overlaying communication network, for distributing a synchronization signal and a beacon signal for communications of the communication network.

2. A method as claimed in claim 1, wherein the network node comprises a cognitive local node that is synchronized to the overlaying communication network and the method further comprises observing a time instant of the guard time period of the user terminal in order to perform the evaluating of the timing.

3. A method as claimed in claim 2, wherein the synchronization signal is distributed periodically to users of the cognitive local node, by utilizing the interference-free guard time period of the user terminal's transmission in the physical random access channel.

4. A method as claimed in claim 1, wherein the network node comprises a cognitive local node and the method further comprises the cognitive local node receiving information about a maximum round trip delay a serving base station has experienced so that the cognitive local node is able to evaluate an overlaying cell size for a cell using the uplink of the communication carrier in the overlaying communication network.

5. A method as claimed in claim 4, comprising utilizing the physical random access channel guard time period anywhere in a cell having a small cell size.

6. A method as claimed in claim 1, wherein the synchronization signal indicates whether the synchronization signal is sent in a beginning or at an end of a physical random access channel transmission time interval of the overlaying communication network.

7. A method as claimed in claim 1, wherein the beacon signal indicates whether the synchronization signal is sent in a beginning or at an end of a physical random access channel transmission time interval of the overlaying communication network.

8. A method as claimed in claim 1, wherein, utilizing further comprises distributing the synchronization signal in a beginning or at an end of a physical random access channel transmission time interval of the overlaying communication network, dependent on an overlaying cell size for a cell using the uplink of the communication carrier in the overlaying communication network.

9. A method as claimed in claim 1, further comprising reading whether the synchronization signal is distributed in a beginning or at an end of a physical random access channel transmission time interval of the overlaying communication network, from a received signal.

10. An apparatus comprising at least one processor and at least one memory including computer program code, the at least one memory and the computer program code configured to, with the at least one processor, cause the apparatus to at least:
evaluate, in a network node of a communication network, timing when a guard time period takes place for a physical random access channel in an uplink of a communications carrier of an overlaying communication network that overlays the communication network; and
based on the evaluating, utilize an interference-free guard time period of a user terminal's transmission in the physical random access channel of the overlaying communication network, for distributing a synchronization signal and a beacon signal for communications of the communication network.

11. An apparatus according to claim 10, wherein the network node comprises a cognitive local node that is synchronized to the overlaying communication network and wherein the at least one memory and computer program code are further configured to, with the at least one processor, cause the apparatus to observe a time instant of the guard time period of the user terminal in order to perform the evaluating of the timing.

12. An apparatus according to claim 11, wherein the at least one memory and computer program code are further configured to, with the at least one processor, cause the apparatus to distribute the synchronization signal periodically to users of the cognitive local node, by utilizing the interference-free guard time period of the user terminal's transmission in the physical random access channel.

13. An apparatus according to claim 10, wherein the network node comprises a cognitive local node and wherein the at least one memory and computer program code are further configured to, with the at least one processor, cause the cognitive local node to receive information about the maximum round trip delay a serving base station has experienced so that the cognitive local node is able to evaluate an overlaying cell size for a cell using the uplink of the communication carrier in the overlaying communication network.

14. An apparatus according to claim 13, wherein the at least one memory and computer program code are further configured to utilize the physical random access channel guard time period anywhere in a cell having a small cell size.

15. An apparatus as claimed in claim 10 wherein the at least one memory and computer program code are further configured to indicate, in the synchronization signal, whether the synchronization signal is sent in a beginning or at an end of a physical random access channel transmission time interval of the overlaying communication network.

16. An apparatus as claimed in claim 10 wherein the at least one memory and computer program code are further configured to indicate, in the beacon signal, whether the synchronization signal is sent in a beginning or at than end of a physical random access channel transmission time interval of the overlaying communication network.

17. An apparatus as claimed in claim 10 wherein utilizing further comprises distributing the synchronization signal in a beginning or at an end of a physical random access channel transmission time interval of the overlaying communication network, dependent on an overlaying cell size for a cell using the uplink of the communication carrier in the overlaying communication network.

18. An apparatus as claimed in claim 10 wherein the at least one memory and computer program code are further configured to read whether the synchronization signal is distributed in the beginning or at an end of a physical random access channel transmission time interval of the overlaying communication network from a received signal.

19. An apparatus as claimed in claim 10, wherein the network node comprises one or more of a femto base station, a femto cell, a machine-to-machine gateway, and a cluster head.

20. A computer program product comprising at least one computer-readable storage memory having computer-executable code portions stored therein, the computer-executable code portions comprising
program code instructions for evaluating, in a network node of a communication network, timing when a guard time period takes place for of a physical random access channel in an uplink of a communications carrier of an overlaying communication network that overlays the communication network; and program code instructions for utilizing, based on the evaluating, an interference-free guard time period of a user terminal's transmission in the physical random access channel of the overlaying communication network, for distributing a synchronization signal and a beacon signal for communications of the communication network.

21. A computer program product according to claim 20, wherein the network node comprises a cognitive local node that is synchronized to the overlaying communication network and the computer program product further comprises program code instructions for observing a time instant of the guard time period of the user terminal in order to perform the evaluating of the timing.

22. A computer program product according to claim 21, further comprising program code instructions for distributing the synchronization signal periodically to users of the cognitive local node, by utilizing the interference-free guard time period of the user terminal's transmission in the physical random access channel.

23. A computer program product according to claim 20, wherein the network node comprises a cognitive local node and the computer program product further comprises program code instructions for receiving at the cognitive local node information about the maximum round trip delay a serving base station has experienced so that the cognitive local node is able to evaluate an overlaying cell size for a cell using the uplink of the communication carrier in the overlaying communication network.

24. A computer program product as claimed in claim 23, further comprising program code instructions for utilizing the physical random access channel guard time period anywhere in a cell having a small cell size.

25. A computer program product as claimed in claim 20, further comprising program code instructions for indicating in the synchronization signal whether the synchronization signal is sent in a beginning or at an end of a physical random access channel transmission time interval of the overlaying communication network.

26. A computer program product as claimed in claim 20, further comprising program code instructions for indicating in the beacon signal whether the synchronization signal is sent in a beginning or at an end of the physical random access channel transmission time interval of the overlaying communication network.

27. A computer program product as claimed in claim 20, wherein utilizing further comprises distributing the synchronization signal in a beginning or at an end of a physical random access channel transmission time interval of the overlaying communication network, dependent on an overlaying cell size for a cell using the uplink of the communication carrier in the overlaying communication network.

28. A computer program product as claimed in claim 20, further comprising program code instructions for reading whether the synchronization signal is distributed in a beginning or at an end of a physical random access channel transmission time interval of the overlaying communication network from a received signal.

* * * * *